United States Patent [19]

Bartos

[11] 4,408,397
[45] Oct. 11, 1983

[54] LATTICE PIE TOP CUTTER GUIDE PLATE

[76] Inventor: Ralph M. Bartos, 6297 Trafalgar Rd., Memphis, Tenn. 38134

[21] Appl. No.: 291,111

[22] Filed: Aug. 7, 1981

[51] Int. Cl.³ .......................... G01B 3/00; B26C 29/00
[52] U.S. Cl. ................................ 33/174 T; 33/174 B; 33/1 F
[58] Field of Search ............ 33/174 T; 174 B, 174 C, 33/1 F; 100/16, 289; 99/DIG. 15

[56] References Cited

U.S. PATENT DOCUMENTS

| D. 136,046 | 7/1943 | Downer | 33/174 T |
|---|---|---|---|
| 1,297,671 | 3/1919 | Fairbank | 33/174 T |
| 2,618,854 | 11/1952 | Clough | 100/16 |
| 3,347,179 | 10/1967 | Haidonyak | 33/1 F |
| 3,376,650 | 4/1968 | Cook | 33/174 B |
| 4,100,676 | 7/1978 | Ferguson | 33/174 T |

Primary Examiner—Willis Little

[57] ABSTRACT

A pie top cutter guide plate that is a simple and foolproof device enabling its user to produce a quality lattice pie top crust with little effort and minimum instruction. A continuing series of alternately arranged slots spaced equidistant apart on a flat plate that when placed on a piece of rolled pie dough and scored in each slot by the user with a sharp object and subsequently pulled apart from the ends perpendicular to the slots forms a lattice pie top crust. It is affordable to all, has no moving parts or sharp cutting edges, is easily cleaned and handily stored. Its basic simplicity was tailored to fit the one pie at a time maker in their own kitchen and not for the professional pie baker. However, the artistic results are professional in every aspect and will enhance the gourmet ability of the cooks in their preparation of a specialty item for the dining table.

1 Claim, 2 Drawing Figures

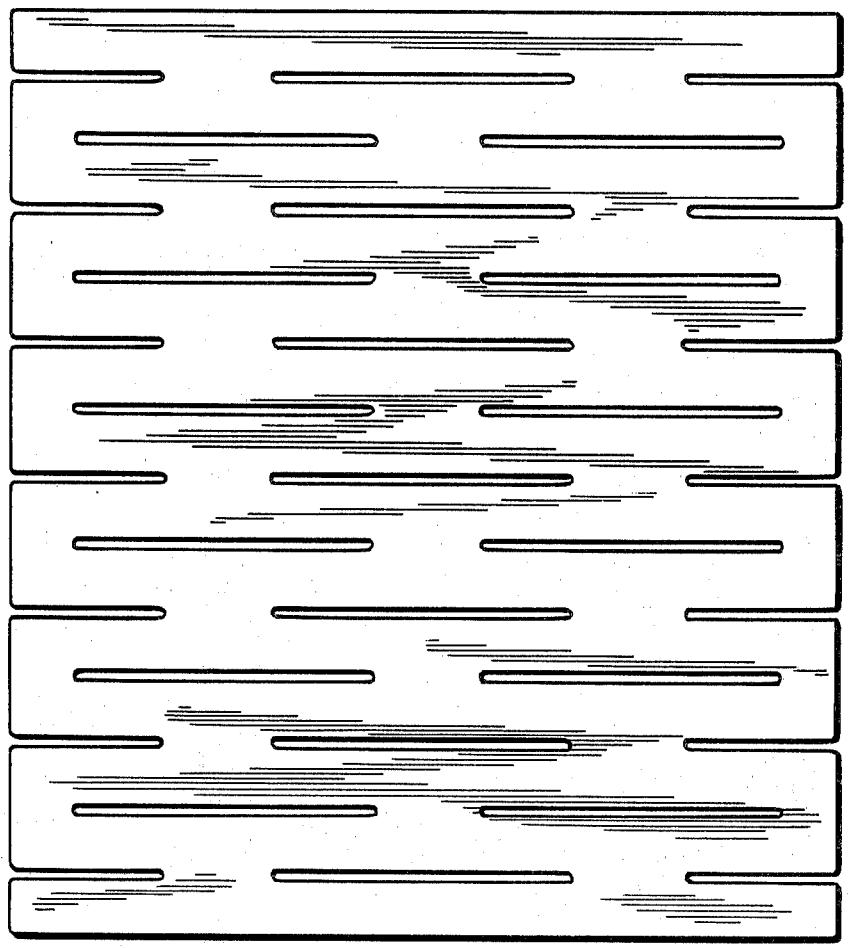

LATTICE PIE TOP CUTTER GUIDE PLATE

Field of Invention

Article of Manufacture.

Discussion of Prior Art

Search revealed that there was no prior art per se. In addition, there were no articles of manufacture designed to cut or form a lattice pie top crust available in a wide variety of department stores and specialty shops in my area with almost a million population. A baker's supply company had a cutter designed for a commercial bakery. This device consisted of a series of slotted circular metal cutter blades mounted on an axel that was set in a rigid frame with a handle attached so as to enable the operator to roll the cutter across the pie dough while at the same time exerting a downward pressure producing cuts that could then be transformed into a latticework of pie dough. This device requires both pressure and applied force by the operator. This device while being suitable for a bakery shop or a pie manufacturer was not intended for the person making a single pie. For reason of comparison I purchased a cutter. No such tool was available in any of the stores searched. This device while doing a completely satisfactory job proved to be difficult to clean and required excessive space to store. The cutter had no name, label, manufacturer or patent number on it. The salesman stated that this type cutter has been available for over fifty years. A second reference is made to "Pie Top Cutter" U.S. Pat. No. 2,618,854, M. S. Clough, November 25, 1952. Again this device was not available in either the baker's supply or department stores. A study of information available revealed that is consisted of a framework of cutter blades placed perpendicular to one another in a round pattern that could be placed on top of the rolled pie dough and when top pressure was applied by the user would cut the dough into a lattice pattern. This device again requires fixed cutter blades and an applied pressure from the operator. While not having a model of this device available for comparison it was logical to assume that it would be difficult to clean and would require considerable space to store. It would be expensive to manufacture, require considerable bulk in packaging and be costly to ship. While I feel there is no prior art directly germane to my invention I felt that I would be remiss in not mentioning the results of my search.

OBJECTS

My invention was designed to be useful to the person that usually makes one pie at a time and desires that extra satisfaction of quality decorative styling in a pie crust top that sets it apart from the average pie without having to resort to the use of commercial devices to achieve gourmet results. My cutter guide plate was designed to be exceedingly simple to use and with given instructions can produce the highest quality results from even a novice in the kitchen. It is safe to use, has no moving parts, can be easily cleaned, handily stored and affordable to any possible buyer. As it can be made from light weight relatively inexpensive materials it can be packaged and shipped to retailers at minimum costs greatly reducing the cost to the consumer. Pounds are reduced to ounces thus conserving energy and materials. This device can replace the time consuming and often frustrating task of cutting individual strips of pie dough and placing them in a crosspatch pattern forming a lattice effect. This simple device can take its place among the many useful inventions that have made their way into the kitchen of millions of people striving to create something more appealing to decorate the dining table. Further objects and advantages of my invention will be apparent from a consideration of the drawings and ensuing description thereof.

BRIEF DESCRIPTION OF DRAWINGS

Drawing is a plan view of a Lattice Pie Top Cutter Guite Plate as seen laid out on a layer of rolled pie dough.

DESCRIPTION OF INVENTION

The guide plates as shown is of thin plastic, wood, metal, paper or any other suitable material. The model selected for drawing is so designed that when the initial cuts are made in the pie dough it can be turned over from right to left or visa versa so as to continue an exact series of cuts (in the slots) for various sizes pies. The model that I constructed and experimented with as illustrated in the FIGURE was 12 inches long and 5 inches wide. The slots indicated in the FIGURE are 2 inches long with a separation of ¾ of an inch between each lengthwise. The alternating rows of slots are offset 1 inch with a ⅜ inch separation between rows. The slots indicated in the FIGURE are 1/32 inch wide allowing space for the insertion of a knife. While this is a practical size, future needs could be flexable as required.

OPERATION

The operation of this invention is very simple and may best be explained in the short series of steps to be taken in using it that follows:

1. After rolling out the pie dough to desired thickness on a well floured flat surface in an oblong shape slightly wider and approximately three inches longer than the diameter of the pie to be covered place the cutter guide plate on top of the dough.
2. With a knife or any suitable cutting device cut the surface of the dough in each slot of the guide plate.
3. Remove cutter guide plate.
4. Grasp the uncut ends of the pie dough on the narrow sides of the oblong pattern, lift the dough from the flat surface, gently pull the dough apart until the desired lattice pattern develops and place on top of the pie base.
5. Trim away excess dough for a finished pie top crust with a lattice pattern.

I claim:

1. A cutting guide plate for cutting dough to form a lattice pie top crust, said guide plate comprising:
    a flat plate made from any suitable material and of adequate thickness with sufficient length and width to cover the piecrust dough a plurality of rows of elongated slots disposed in said plate, the slots in each of said rows being separated at their end or ends by predetermined equally spaced intervals so aligned alternately and equidistant apart such that no spaced interval is aligned directly above or below like spaced intervals in the immediately preceeding and succeeding rows, whereby the dough can be cut in such a manner that when subsequently stretched and applied to a pie will constitute a continuing series of obtuse and acute angles forming said lattice pie top crust.

* * * * *